H. S. SWANSON.
AUTOMOBILE TRANSMISSION GEARING.
APPLICATION FILED MAR. 26, 1917.

1,259,563.

Patented Mar. 19, 1918.
3 SHEETS—SHEET 1.

WITNESS:
R. E. Hamilton

INVENTOR.
Herman S. Swanson,
BY
F. G. Fischer,
ATTORNEY.

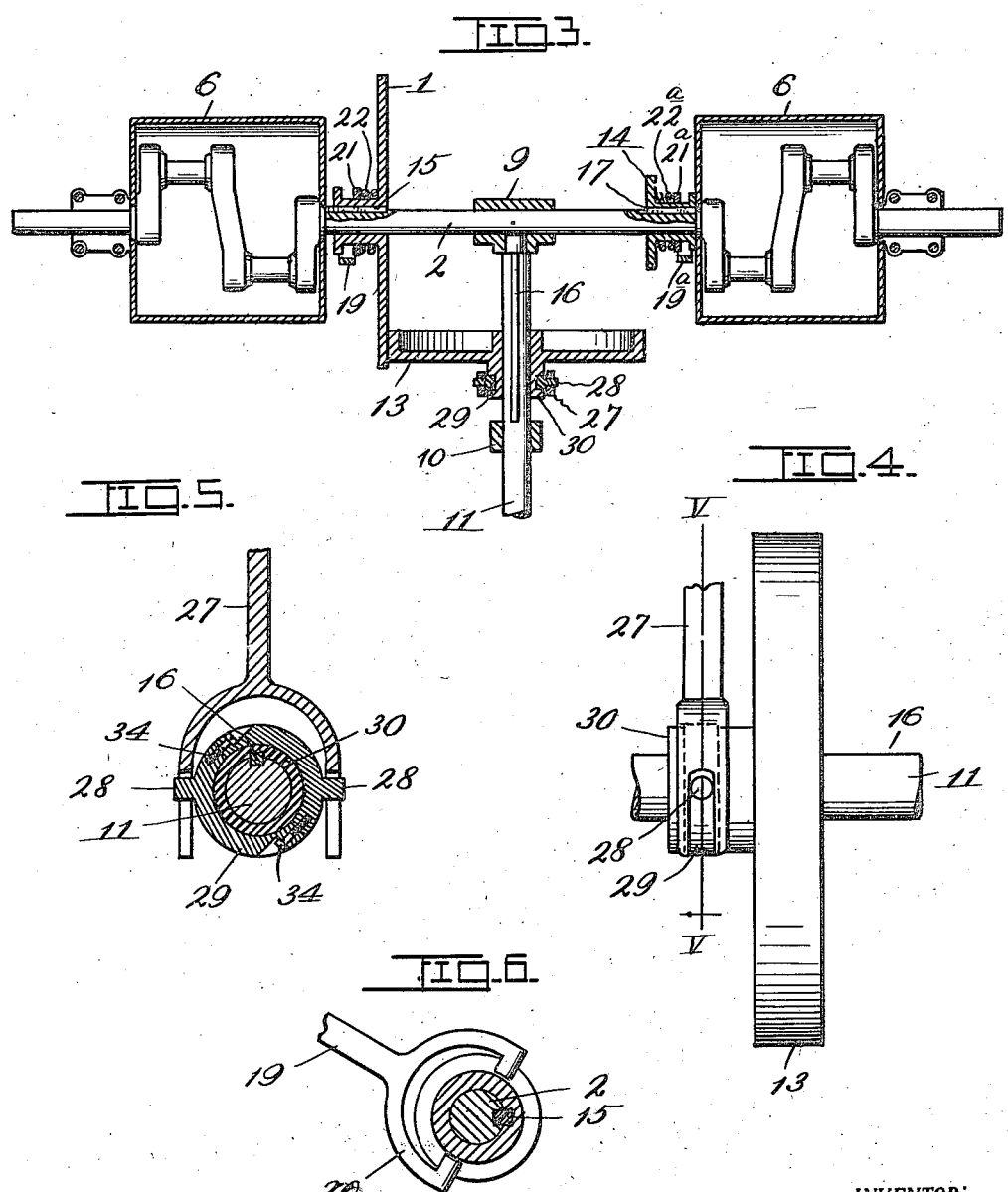

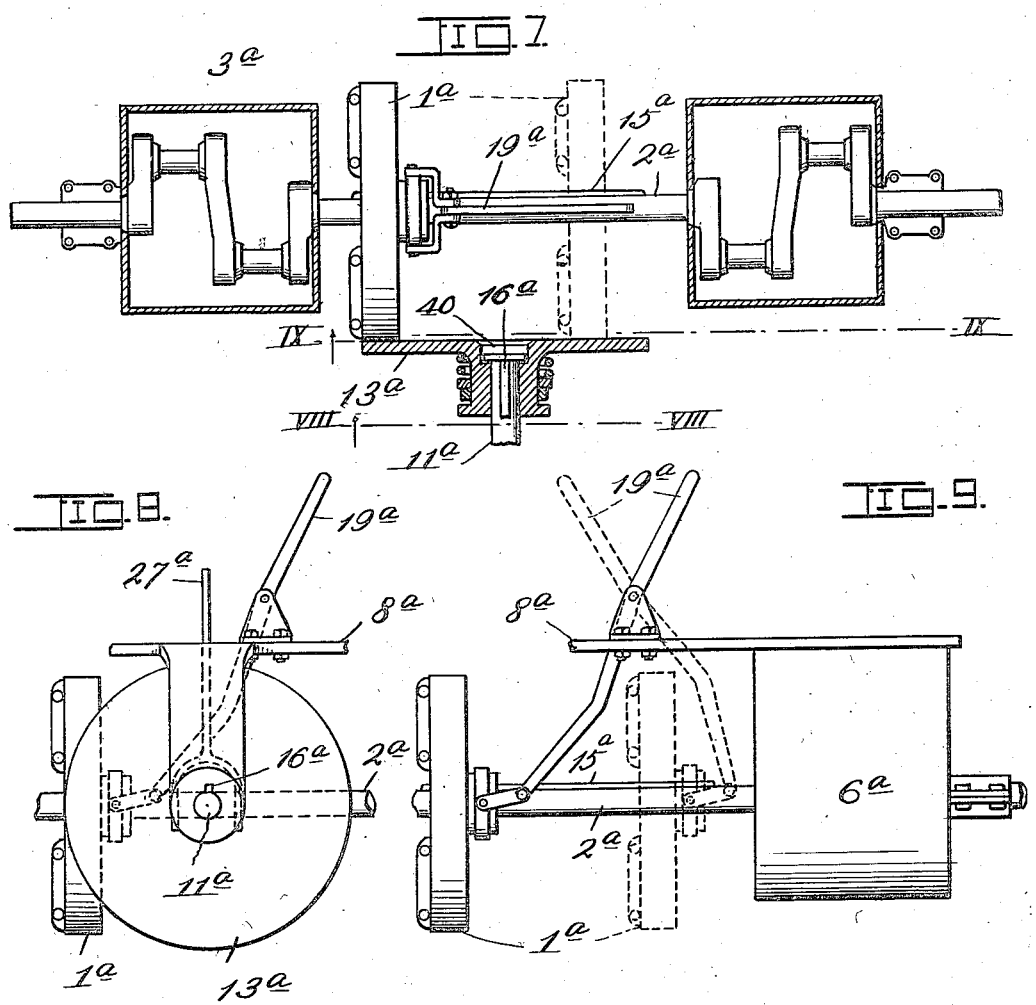

UNITED STATES PATENT OFFICE.

HERMAN S. SWANSON, OF ST. JOSEPH, MISSOURI.

AUTOMOBILE TRANSMISSION-GEARING.

1,259,563.   Specification of Letters Patent.   Patented Mar. 19, 1918.

Application filed March 26, 1917. Serial No. 157,342.

*To all whom it may concern:*

Be it known that I, HERMAN S. SWANSON, a citizen of the United States, residing at St. Joseph, in the county of Buchanan and State of Missouri, have invented certain new and useful Improvements in Automobile Transmission-Gearing, of which the following is a specification.

My invention relates to friction transmission gearing for automobiles and other self-propelled vehicles, and one object is to provide a simple, reliable, and efficient gearing of this character whereby different forward and reverse speeds may be had without the use of the usual selective type of spur gears. A further object is to eliminate the customary clutch and the numerous parts associated therewith for transmitting power from the motor shaft to the propeller shaft of an automobile.

Other objects of the invention will hereinafter appear, and in order that said invention may be fully understood, reference will now be made to the accompanying drawings, in which:

Fig. 3 is a horizontal section on line III—III of Fig. 1.

Fig. 4 is a side view of a driven gear and adjacent parts employed in carrying out the invention.

Fig. 5 is a vertical section on line V—V of Fig. 4.

Fig. 6 is a vertical section on line VI of Fig. 1.

Fig. 7 is a horizontal section of a modified form of transmission gearing.

Fig. 8 is a section on line VIII—VIII of Fig. 7.

Fig. 9 is a section on line IX—IX of Fig. 7.

Figure 1:
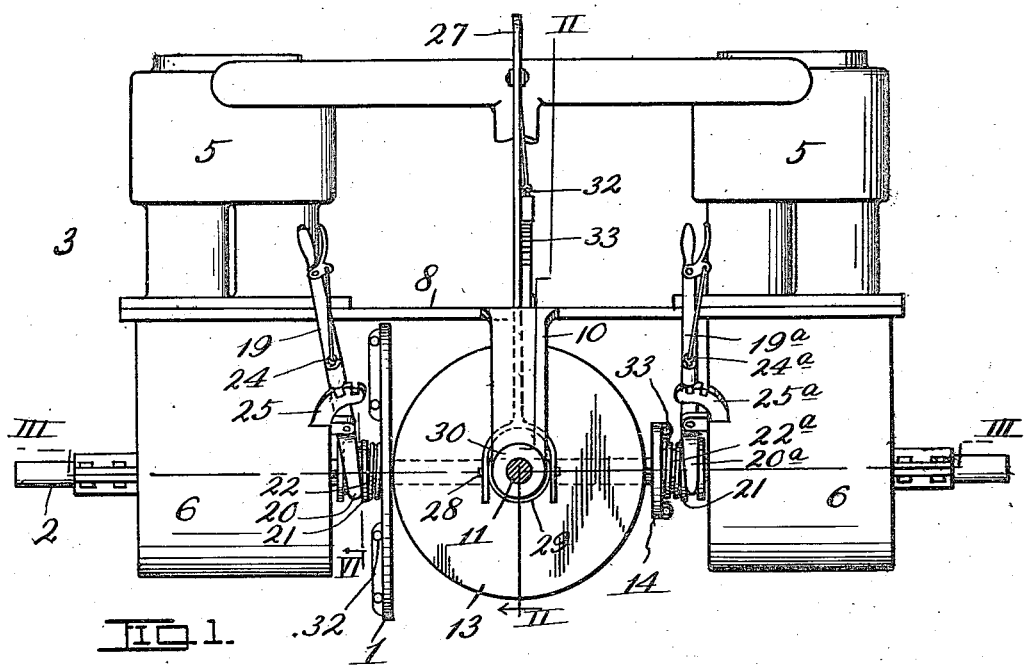
Figure 1 is an elevation of the preferred form of transmission gearing associated with a motor for driving said gearing.
Figure 2:
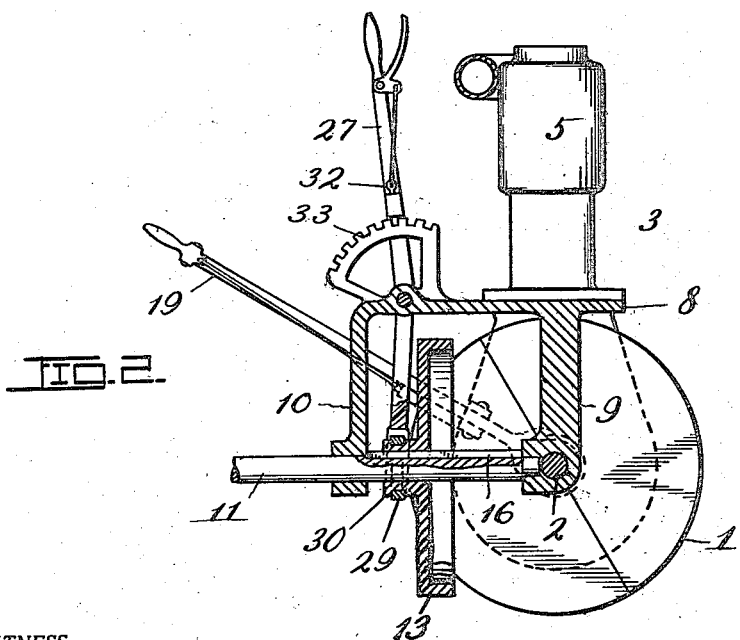
Fig. 2 is an irregular vertical section on line II—II of Fig. 1.

Referring more particularly to the preferred form, 1 designates a drive disk which is mounted directly upon the crank shaft 2 of a multicylinder motor 3. Said motor 3 is placed transversely to the chassis (not shown) of the automobile and in the present instance embodies four cylinders 5, arranged in pairs which are spaced apart to admit the transmission gearing under consideration. The two pairs of cylinders 5 and associated crank cases 6 are rigidly connected by a yoke 8 having centrally-disposed depending brackets 9 and 10, in which the forward portion of the propeller shaft 11 is journaled.

13 designates a friction disk mounted upon the propeller shaft 11 and adapted to be driven in one direction by the drive disk 1, and in a reverse direction by a disk 14. The disks 1, 13, and 14 have groove-and-feather connections 15, 16, and 17, respectively, with the shafts upon which they are mounted, so that they may slide upon said shafts and also rotate therewith.

The drive disk 1 and the reverse disk 14 have but slight movement longitudinally of the shaft 2, so that they may be adjusted either to neutral position or into frictional engagement with the peripheral face of the driven disk 13, which has considerable movement longitudinally of the propeller shaft 11, so that it may slide forward toward the center or backward toward the periphery of the drive disk 1 in order to be driven at different speeds thereby, it being understood that its speed is increased in proportion to its adjustment toward the periphery of said drive disk 1.

The respective disks may be adjusted longitudinally of their shafts by any suitable form of shifting mechanism. In the drawings, I have shown a simple type of shifting mechanism wherein a lever 19 is employed to shift the drive disk 1. Said lever 19 has a bifurcated terminal 20 straddling the flanged hub of the drive disk 1 and bearing against a collar 21 loosely-mounted upon said hub and pressing against a coil spring 22, which in turn presses against the rear side of the drive disk 1 to yieldingly-hold it in engagement with the driven disk 13. By throwing the lever 19 in one direction the driver 1 is shifted into engagement with the driven disk 13, and by throwing said lever in an opposite direction the driver 1 is shifted out of engagement with said driven disk 13. The lever 19 is reliably held in either position by a latch 24 coacting with a notched segment 25.

Means for shifting the reverse disk 14 in and out of engagement with the driven disk 13 is a duplicate of the shifting mechanism for controlling the driver 1, and has corresponding reference numerals with exponents added thereto. The shifting mechanism for controlling the driven disk 13 consists of a lever 27, the bifurcated lower end of which is slotted to admit diametrically-opposed lugs 28 projecting from a collar 29 arranged in a peripheral groove in the hub 30 of said driven disk 13. The lever 27 is held in any of its adjusted positions by a latch 32 and a coacting sector 33.

In order that the disks 1 and 14 and the collar 29 may be readily placed in position or removed, each is made in two parts, the disks 1 and 14 being held together by bolts 32 and 33, respectively, while the two parts of the collar 29 are held together by screws 34. The propeller shaft 11 may be provided with one or more universal joints between its forward portion and its rear end, where it connects to the customary differential, but as such universal joints are in common use I have not deemed it necessary to portray them in the drawings.

Operation: In order to propel a car provided with my mechanism forwardly, the driven gear 1 is shifted into frictional engagement with the driven disk 13, which is adjusted toward the center or the periphery of the driver 1 to obtain the different speeds desired. If it is desired to back the car the driver 1 is thrown out of engagement with the driven disk 13, which is then advanced until it is opposite the reverse gear 14, which is then shifted into engagement with the face of driven disk 13. When it is desired to stop the driven gear 13 without stopping the motor the two disks 1 and 14 are shifted backward against the action of the springs 22 and 22$^a$, respectively, and away from the face of the driven disk 13.

By dividing the cylinders 5 in two sets and spacing said sets apart, the driver 1 and the reverse gear 14 can be mounted directly upon the motor shaft 2 in the space between the two sets, and thus be in position to drive the gear 13 direct and without the interposition of countershafts, bevel gears, and other more or less complicated gearing with its attendant cost and loss of power.

In the modified form disclosed by Figs. 7 to 9, inclusive, the construction is similar to the preferred form as indicated by like numerals with exponents, the chief difference being that the driver 1$^a$ on the motor shaft 2$^a$ is adapted to drive the driven wheel 13$^a$ in reverse directions. Thus the reverse gear of the preferred form is dispensed with. In the modified form, the driver 1$^a$ which is shifted by the lever 19$^a$ has a long movement on the motor shaft 2$^a$, so that it may be adjusted into engagement with the driven wheel 13$^a$ on either side of the axis thereof to drive it either forward or backward. The driven wheel 13$^a$ has a recess 40 at its central portion, so that as the driver 1$^a$ is shifted across said recess 40, it passes out of contact with the driven wheel 13$^a$ and gives the same an opportunity to stop or slow up before its motion is reversed by the driver 1$^a$ coming into contact with its opposite side. The driven wheel 13$^a$ may be stopped either by shifting the drive wheel 1$^a$ opposite the recess 40, or by shifting the driven wheel 13$^a$ backwardly out of engagement with the driver 1$^a$, through the intermediacy of the lever 27$^a$.

Having thus described my invention, what I claim and desire to secure by Letters Patent, is:

1. In a transmission gearing, a yoke having centrally disposed depending brackets on its opposite sides, a driven shaft journaled in said brackets, a driving shaft beneath and extending longitudinally of said yoke, driving means supported from the respective yoke ends and having parts depending from the yoke and connected to the ends of the driving shaft, said driving shaft extending through one of said brackets at points beyond the adjacent end of the driven shaft and at right angles to the latter, a disk on the driven shaft arranged between said brackets, and a disk on the driving shaft engageable with the first named disk.

2. In a transmission gearing, a yoke having a centrally disposed depending bracket on one of its sides, a driving shaft extending beneath and longitudinally of said yoke, a pair of drivers connected to the yoke and disposed adjacent the respective ends thereof and having parts extending below the yoke and connected to the respective ends of the driving shaft to support the latter, a driving disk on the driving shaft, a driven shaft journaled in said bracket, and a driven disk on the driven shaft engageable with said driving disk.

In testimony whereof I affix my signature, in the presence of two witnesses.

HERMAN S. SWANSON.

Witnesses:
F. G. FISCHER,
L. J. FISCHER.